April 4, 1950
E. J. VON PEIN
2,502,608
SPOOL AND ROD SUPPORTING STRUCTURE
FOR FISHING REELS
Filed Dec. 6, 1948
2 Sheets-Sheet 2
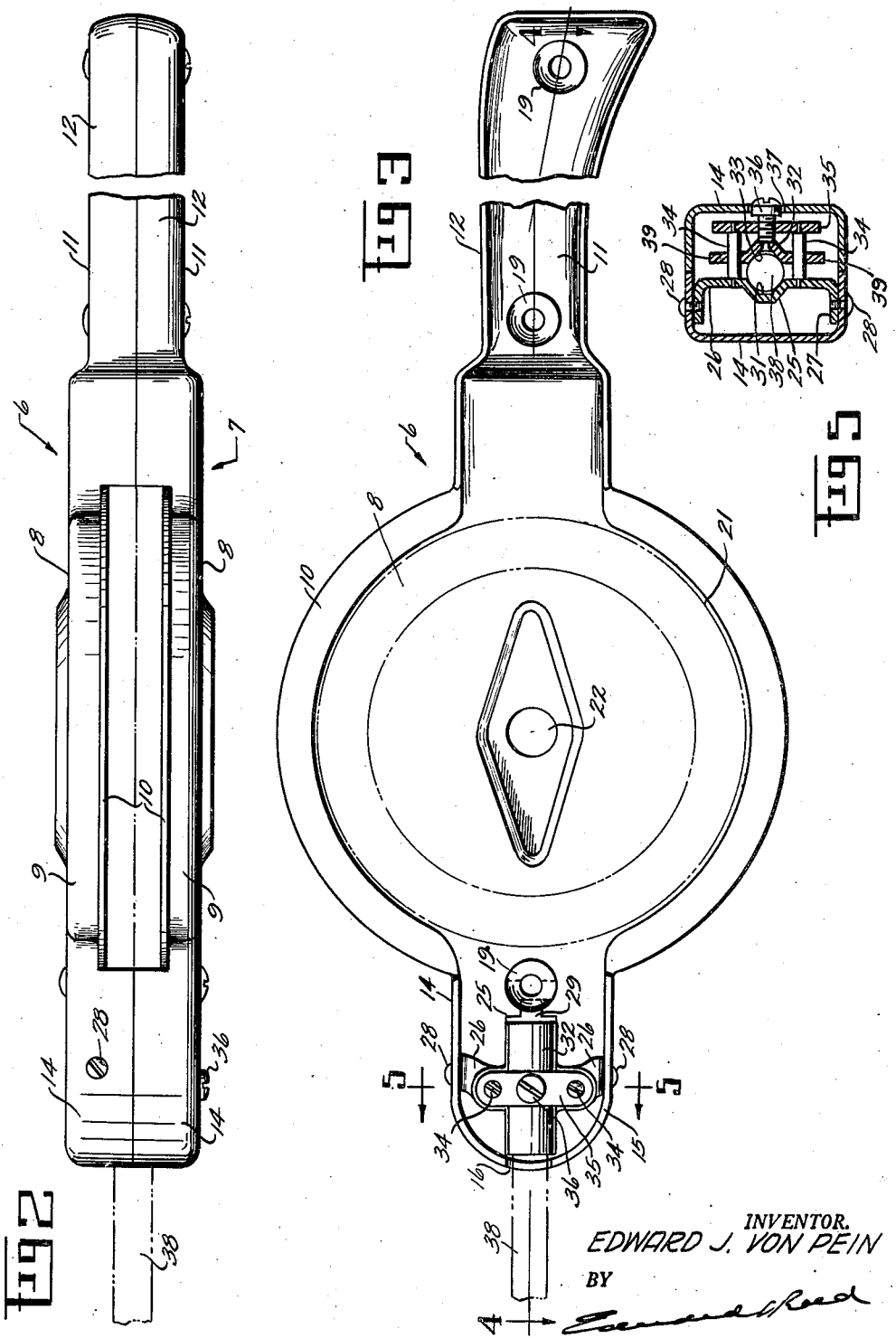
INVENTOR.
EDWARD J. VON PEIN
BY
ATTORNEY—

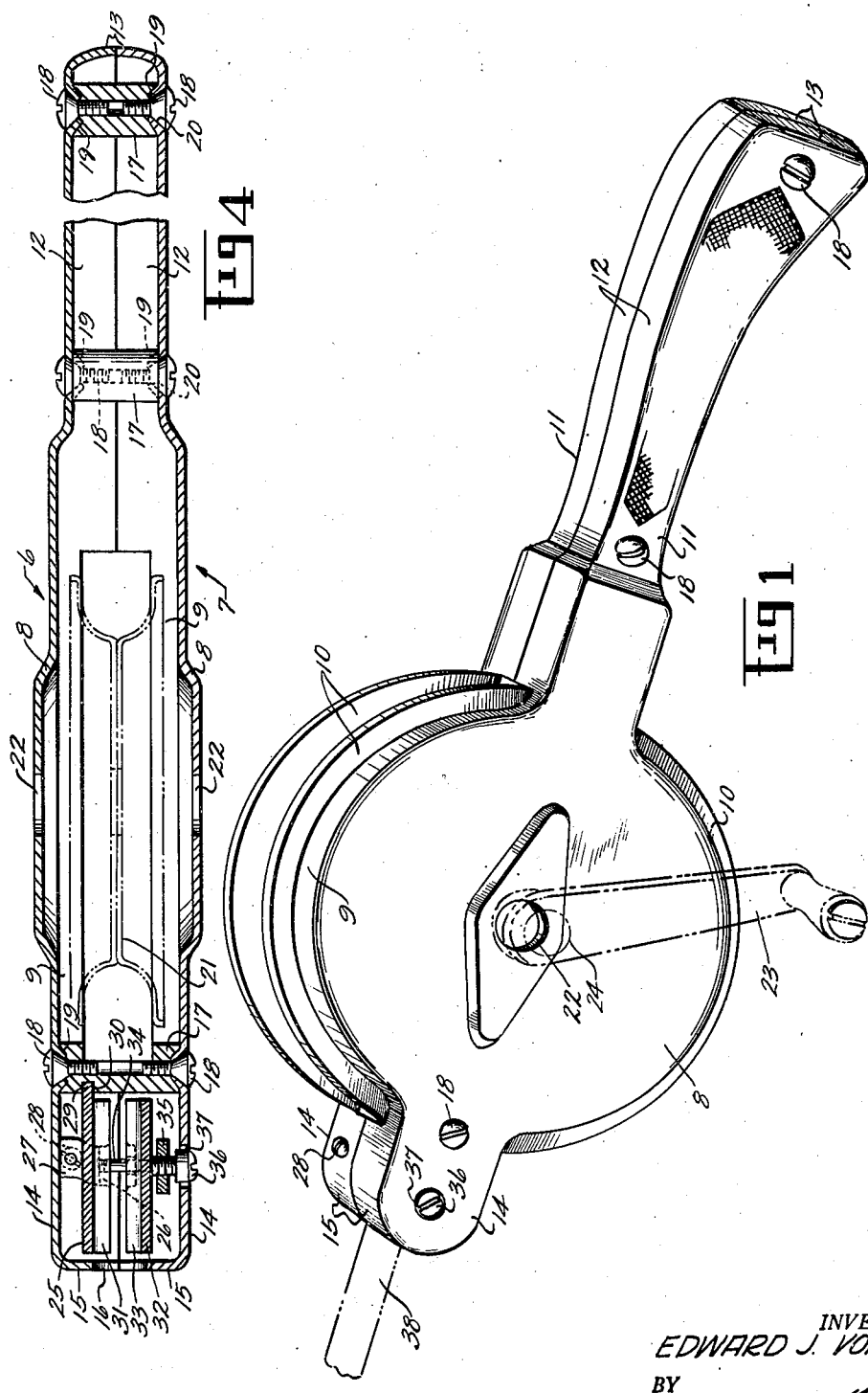

Patented Apr. 4, 1950

2,502,608

UNITED STATES PATENT OFFICE 2,502,608

SPOOL AND ROD SUPPORTING STRUCTURE
FOR FISHING REELS

Edward J. Von Pein, Dayton, Ohio

Application December 6, 1948, Serial No. 63,825

5 Claims. (Cl. 43—20)

This invention relates to a spool and rod supporting structure for a fishing reel.

One object of the invention is to provide such a supporting structure which is of simple, inexpensive construction, efficient in use and of pleasing appearance.

A further object of the invention is to provide such a supporting structure comprising two members each of which includes parts of each of a plurality of supporting elements so arranged that the complete structure may be produced by connecting the two members one with the other.

A further object of the invention is to provide such a supporting structure each of the two members of which may be produced in one piece, as by blanking and forming operations.

A further object of the invention is to provide such a supporting structure having in the rod supporting portion thereof an efficient rod chuck which is operable from the exterior of the structure.

Other objects of the invention may appear as the device is described in detail.

In the accompanying drawings Fig. 1 is a perspective view of the supporting structure; Fig. 2 is a top plan view of the same; Fig. 3 is an inside elevation of one member of the supporting structure; Fig. 4 is a section through both members of the supporting structure taken on the line 4—4 of Fig. 3; and Fig. 5 is a transverse section through both members of the supporting structure taken on the line 5—5 of Fig. 3.

In these drawings I have illustrated the preferred embodiment of the invention and have shown the supporting structure as comprising a spool supporting portion, a handle portion and a rod supporting portion, but it is to be understood that the structure as a whole, as well as the several parts thereof, may take various forms and may be assembled in various ways without departing from the spirit of the invention.

In the embodiment here illustrated the supporting structure comprises two members, 6 and 7, of relatively thin stiff material of light weight, such as sheet aluminum or solidified plastic material. Each of the members includes an intermediate portion 8 forming one side wall of a spool supporting frame. Preferably the frame is substantially circular in form and each side wall thereof has its upper and lower edge portions bent inwardly to form transverse flanges 9 and then radially to form flanges 10. Each wall of the spool supporting frame has a relatively narrow rearwardly extending portion 11 forming a part of a handle and preferably shaped to provide a good hand grip. The extension or handle portion 11 of each member has its marginal portions bent laterally to provide the same with upper and lower flanges 12 and with end flanges 13. Each member is also provided with a relatively narrow portion 14 extending forwardly from the frame portion thereof and constituting a part of a rod support. The marginal portions of the parts 14 are bent inwardly to form flanges 15 which preferably extend entirely about the exterior edges thereof. The flanges 15 at the ends of the two extensions 14 are provided with opposed recesses 16 to form an opening through which the end portion of a rod may be inserted.

The several parts of each of the members 6 and 7 are of the same size and contour so that when connected one with the other in parallel face to face arrangement they will constitute the complete supporting structure, as shown in Fig. 1. The two members may be connected one with the other in any suitable manner but preferably a plurality of spacing elements 17 are interposed between the two members and rigidly secured thereto. In the present arrangement two such spacing elements are interposed between the two parts of that handle and a third spacing element is interposed between the two parts of the rod support adjacent the spool supporting frame. Preferably each spacing member 17 is provided at both ends with screw threaded openings to receive attaching screws 18 which extend through openings in the respective handle portions of the two members 6 and 7. In the arrangement shown those parts of the members adjacent the screw receiving openings are bent inwardly to conical form, as shown at 19, to receive the tapered heads of the screws, each end of the spacing element being countersunk to receive this conical portion, as shown at 20. When the two members 6 and 7 are so connected the radial flanges 10 of the spool supporting frame 8 are spaced one from the other a distance approximating the width of the line receiving channel of the spool 21 which is rotatably supported between the walls of the frame, the latter being provided with openings 22 to receive the spool shaft. The marginal flanges 12 and 15 of the handle and rod supporting portions of the structure are respectively in line one with the other and are preferably, but not necessarily, in abutting contact. The spool is rotated in the usual manner as by means of one or more handles 23 connected with the spool shaft 24.

The rod may be supported in the rod supporting portions of the structure in any suitable manner but preferably a suitable chuck is enclosed between the forward extensions 14 of the two members and is operable from the exterior of the structure. As here shown the rod chuck comprises an elongate rod engaging member 25 rigidly mounted on the extension 14 of the member 6. Preferably it is supported in spaced relation to the extension 14 by laterally extending arms 26 having parts 27 rigidly secured to and in contact with the respective flanges 15, as by screws 28. The rod engaging member 25 and the adjacent spacing member 17 may be provided with interlocking parts to rigidly retain the rod engaging member in parallelism with the extension 14 and for this purpose the rod engaging member is provided with a rearwardly projecting lip 29 extending into a recess 30 in the adjacent spacing element. The rod engaging member is provided in its inner surface with a longitudinal groove 31 to receive the adjacent portion of the rod and the converging side walls of this groove are preferably non-circular so that it is adapted to operatively engage rods of different diameters. A second elongate rod engaging member 32 is supported by the part 14 of the member 6 for movement toward and from the rod engaging member 25 and is provided with a longitudinal groove 33 to cooperate with the groove in the rod engaging member 25. Preferably this second rod engaging member 32 is provided with lateral extensions 39 having openings therethrough whereby they may be slidably mounted on studs 34 rigidly secured to the respective lateral extensions 26 of the rod engaging member 25. Rigidly secured to the upper ends of the studs 34 is a cross bar 35. A screw 36 extends through and has screw threaded connection with the cross bar and is connected at its inner end with the rod engaging member 32 for rotation with relation thereto but is held against axial movement with relation thereto, so that the rod engaging member 32 may be positively moved in either direction by the rotation of the screw. The extension 14 of the frame member 7 is provided with an opening 37 in line with the screw and through which the screw may be operated. Preferably the outer end portion of the screw extends through the opening 37 and in the position here shown the head of the screw is in the opening. Thus when the movable rod engaging member is spaced from the fixed rod engaging member the end portion of a rod, as shown at 38, may be inserted through the opening in the forward end of the rod supporting portion of the structure and between the two rod engaging members. The movable rod engaging member is then actuated from the exterior of the structure, by rotating the screw, to clamp the rod tightly beween the two rod engaging members, and the screw will firmly hold the movable rod engaging member in engagement with the rod.

With the two members of the supporting structure in their assembled positions the side walls of the frame are spaced a substantial distance from the spool and this distance is sufficient to permit the spool controlling devices, such as the brake mechanism, click mechanism and yieldable retarding device, to be mounted on the frame wall 8 of the member 6, wholly independent of the frame member 7, in the manner shown in my pending application filed September 29, 1948, Serial Number 51,820. Thus the member 7 of the structure may be detached from the member 6 and removed therefrom without disturbing the controlling devices or the rod chuck, both of which are mounted on the member 6, thereby enabling these devices to be inspected and adjusted while in their operative positions with relation one to the other.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is

1. In a fishing reel, a spool supporting frame comprising two laterally spaced members adapted to receive a spool between them and having opposed extensions forming a support for a rod chuck, means for detachably connecting said members one to the other, and a rod chuck in said chuck support including a rod engaging member secured to one of said extensions, guide members rigid with said rod engaging member, a second rod engaging member movable on said guide members toward and from the first mentioned rod engaging member, and means supported by said guide members and operable from the exterior of said chuck support for actuating said movable rod engaging member.

2. In a fishing reel, a spool supporting frame comprising two laterally spaced members adapted to receive a spool between them and having opposed extensions forming a support for a rod chuck, means for detachably connecting said members one to the other, and a rod chuck in said chuck support including a rod engaging member secured to one of said extensions, guide members rigid with said rod engaging member, a cross member supported by said guide members adjacent to but out of contact with the other of said extensions, a second rod engaging member slidable on said guide members between said cross member and the first mentioned rod engaging member, and a rotatable actuating device mounted in said cross member and operatively connected with said second rod engaging member, the last mentioned extension having an opening in line with said actuating device.

3. In a fishing reel, a spool supporting frame comprising two laterally spaced members adapted to receive a spool between them and having opposed extensions forming a support for a rod chuck, means for detachably connecting said members one to the other, and a rod chuck between said extensions including an elongate rod engaging member having laterally extending parts rigidly secured to one of said extensions, parallel studs rigidly secured to said parts of said rod engaging member and extending toward the other of said extensions, a cross bar secured to said studs, a second elongate rod engaging member slidable on said studs between said cross bar and the first mentioned rod engaging member, and a screw extending through said cross bar, having threaded connection therewith and operatively connected with said second rod engaging member, said other of said extensions having an opening in line with said screw.

4. In a fishing reel, a supporting structure including a spool supporting frame, a handle and a rod support, said structure comprising two separate and substantially parallel members of similar contour and having opposed marginal flanges, each of said members including a substantially circular portion constituting one side wall of said frame, a rearwardly extending portion constituting a part of said handle, and a forwardly extending portion constituting a part of said rod support, spacing elements between said members, screws connecting said members with said spacing elements, a rod chuck in said rod support, supported wholly by one of said forwardly extending portions and including an operable part, and a device for adjusting said part, the other of said forwardly extending portions having an opening in line with said actuating device.

5. In a fishing reel, a supporting structure including a spool supporting frame, a handle and a rod support, said structure comprising two separate and substantially parallel members of similar contour and having opposed marginal flanges, each of said members including a substantially circular portion constituting one side wall of said frame, a rearwardly extending portion constituting a part of said handle, and a forwardly extending portion constituting a part of said rod support, spacing elements between said members, screws connecting said members with said spacing elements, one of said spacing elements being adjacent said rod support, a rod engaging member secured to one of said forwardly extending portions, said rod engaging member and the adjacent spacing element having interlocking parts, a cross bar rigidly connected with and spaced from said rod engaging member, a second rod engaging member supported between said cross bar and the first rod engaging member and movable toward and from the latter, and an actuating screw in said cross bar operatively connected with said second rod engaging member, the other of said forwardly extending portions having an opening into which the outer end of said screw may extend.

EDWARD J. VON PEIN.

REFERENCES CITED

The following references are of record in the file of this patent:

UNITED STATES PATENTS

| Number | Name | Date |
|---|---|---|
| 1,735,026 | Welch | Nov. 12, 1929 |
| 2,315,539 | Nelson | Apr. 6, 1943 |